United States Patent

Hoog et al.

[11] Patent Number: 6,122,955
[45] Date of Patent: Sep. 26, 2000

[54] LIQUID LEAK DETECTOR

[76] Inventors: Hollis Ellsworth Hoog, W312 Hastings Rd., Apt. 136, Spokane, Wash. 99218-3710; Darrell Arron Hoog, 10037 SE. 190th St., Renton, Wash. 98055

[21] Appl. No.: 09/158,367

[22] Filed: Sep. 17, 1998

[51] Int. Cl.[7] ............................. G01F 23/72; G01F 23/62; F01P 7/16
[52] U.S. Cl. ................................. 73/40; 73/308; 73/305; 73/49.3; 73/49.7; 340/603
[58] Field of Search ............................. 73/49.3, 40, 49.7, 73/305, 308, 49.2, 41; 340/603; 422/41

[56] References Cited

U.S. PATENT DOCUMENTS

| | | | |
|---|---|---|---|
| 4,137,495 | 1/1979 | Brown | 324/30 B |
| 4,178,802 | 12/1979 | Yamamoto | 73/313 |
| 4,823,116 | 4/1989 | Kitchen, III et al. | 340/603 |
| 4,879,545 | 11/1989 | Aguilar | 340/624 |
| 4,924,703 | 5/1990 | White et al. | 73/308 |
| 4,955,231 | 9/1990 | Mahoney | 73/313 |
| 5,020,366 | 6/1991 | Elfverson et al. | 73/313 |
| 5,196,824 | 3/1993 | Helm | 340/450.3 |
| 5,422,495 | 6/1995 | Cohn | 250/573 |
| 5,699,759 | 12/1997 | Hollis | 123/41.08 |
| 5,851,108 | 12/1998 | Clymer et al. | 417/44.1 |

*Primary Examiner*—Hezron Williams
*Assistant Examiner*—J. David Wiggins

[57] ABSTRACT

The liquid Leak Detector container must be mounted on the radiator support frame in a level position about eight inches from the radiator in line with the overflow tube. The overflow tube has to be cut to enable the tube ends to be fitted over each nipple of the container and secured by adjustable clamps. The radiator must be filled up with coolant to the top of the radiator filling neck while pinching the overflow tube below the coolant level of the overflow holding tank. The radiator cap is put on tight and the pinched tube released. When the engine is started up the coolant will increase in temperature and expand forcing the coolant to flow through the detector container to the overflow holding tank until the engine has reached operating temperature. The coolant will flow back into the radiator when the engine is not running.

The presence of air in the coolant begins to accumulate in the top of the radiator when a leak develops. The coolant is released to flow down the overflow tube and evacuating the detector container. This allows the float and switch assembly magnets to come into alignment and close against the container wall. The electrical contacts on the brass strips are closed before the switch assembly magnet reaches the detector container wall.

4 Claims, 2 Drawing Sheets

Figure 2
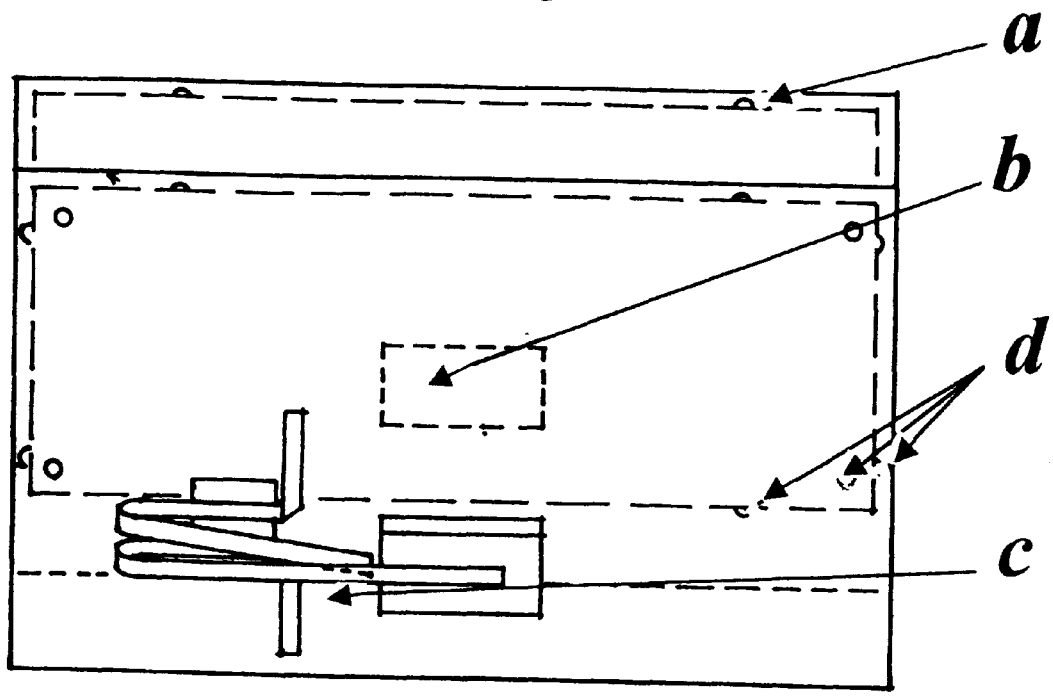
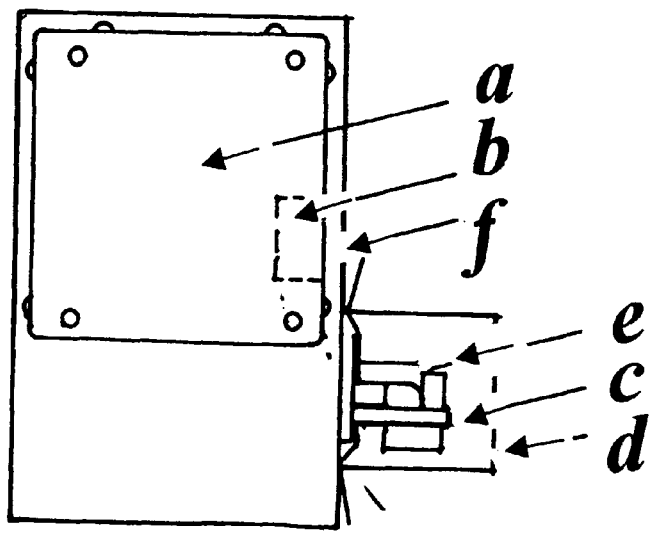
Figure 3

LIQUID LEAK DETECTOR

BACKGROUND OF THE INVENTION

After retiring and traveling around the United States and Canada, I saw many vehicles pulled off the road with the hood up and steam pouring out of the engine compartment. This is when I thought that there must be some way to prevent this irritating and difficult situation to cope with on a trip or when travel time was important.

I finally developed a means of detecting a slight leak in the cooling system. After the last ten years of drawing up and experimenting with ideas that came to my mind, I found a fault in all but the last idea which has proven to be a dependable leak detector. This design enables the leak to be detected when the radiator has only lost four or five ounces of water. This allows the driver to check for leakage and make temporary repair or drive on a few miles and make a recheck of the water level in the radiator. This no doubt will avoid time delay plus the cost of a towing truck and possible engine damage due to extreme temperature of coolant in the radiator and engine block.

BRIEF SUMMARY AND DESCRIPTION OF THE INVENTION

The Liquid Leak Detector for a vehicle's liquid coolant system consists of a plastic container with inlet and outlet nipples at each end in addition to a small box with switch actuator and a float switch magnet. The ends of the container are tapered so the front side slants inward at the bottom. Inside the container is a plastic foam float that has a small magnet inserted in the lower central front area. The float has rounded head brass brads inserted in each corner of all sides of the float. The small box on the front side of the container covers the switch actuator assembly. The switch assembly consists of two brass strips secured to the container wall. The strips are positioned and formed to make contact when the top strip holding a second magnet is drawn by magnetic force to the container wall by the float magnet.

DETAILED DESCRIPTION FOR OPERATION OF THE INVENTION

The Leak Detector container is mounted on the vehicle hood frame between the radiator and the overflow holding tank. The detector container must be mounted in a level position as near the radiator as possible while being mounted in-line with an overflow tube extending therebetween. The fluid overflow tubing must be cut into at a point where the end of each tube can be connected to the nipples on each end of the detector container and secured by adjustable clamps. The radiator must be filled up with fluid coolant to the top of the radiator filling neck while pinching the overflow tube at a height below the coolant level of the overflow holding tank. The radiator cap is then put on tight before the pinched tube is released. When the engine is started-up the coolant will increase in temperature and expand thereby forcing the hot coolant to flow through the detector container to the overflow holding tank until the engine has reached operating temperature. When a leak occurs in the vehicle cooling system, air starts accumulating at the top of the radiator. Fluid coolant is released and starts to flow down the overflow tube through the detector container to the overflow holding tank, thereby informing him or her of a coolant leak somewhere in the vehicle's engine cooling system or radiator. All of the remaining fluid coolant will flow back into the radiator from the overflow holding tank when the vehicle engine is not running. The float in the detector container drops down moving the float magnet into alignment with the second magnet secured to the top brass strip of the switch assembly. When the float magnet is pulled into the wall of the detector container due to mutual magnetic force arising from close proximity of the top brass strip with its second magnet, it also closes on the second or lower brass strip making the electrical contact which lights the warning light in the vehicle instrument panel to attract the drivers attention, thereby informing him or her of a coolant leak somewhere in the vehicle's engine cooling system or radiator. All of the remaining fluid coolant will flow bsck into the radiator from the overflow holding tank when the vehicle engine is not running.

BRIEF DESCRIPTION OF THE DRAWINGS

FIG. 2 Container enclosure with float assembly inside and location of switch on front wall.

FIG. 3 Open end view of container.

PARTS LISTING FOR THE LEAK DETECTOR APPARATUS

Figure 1:
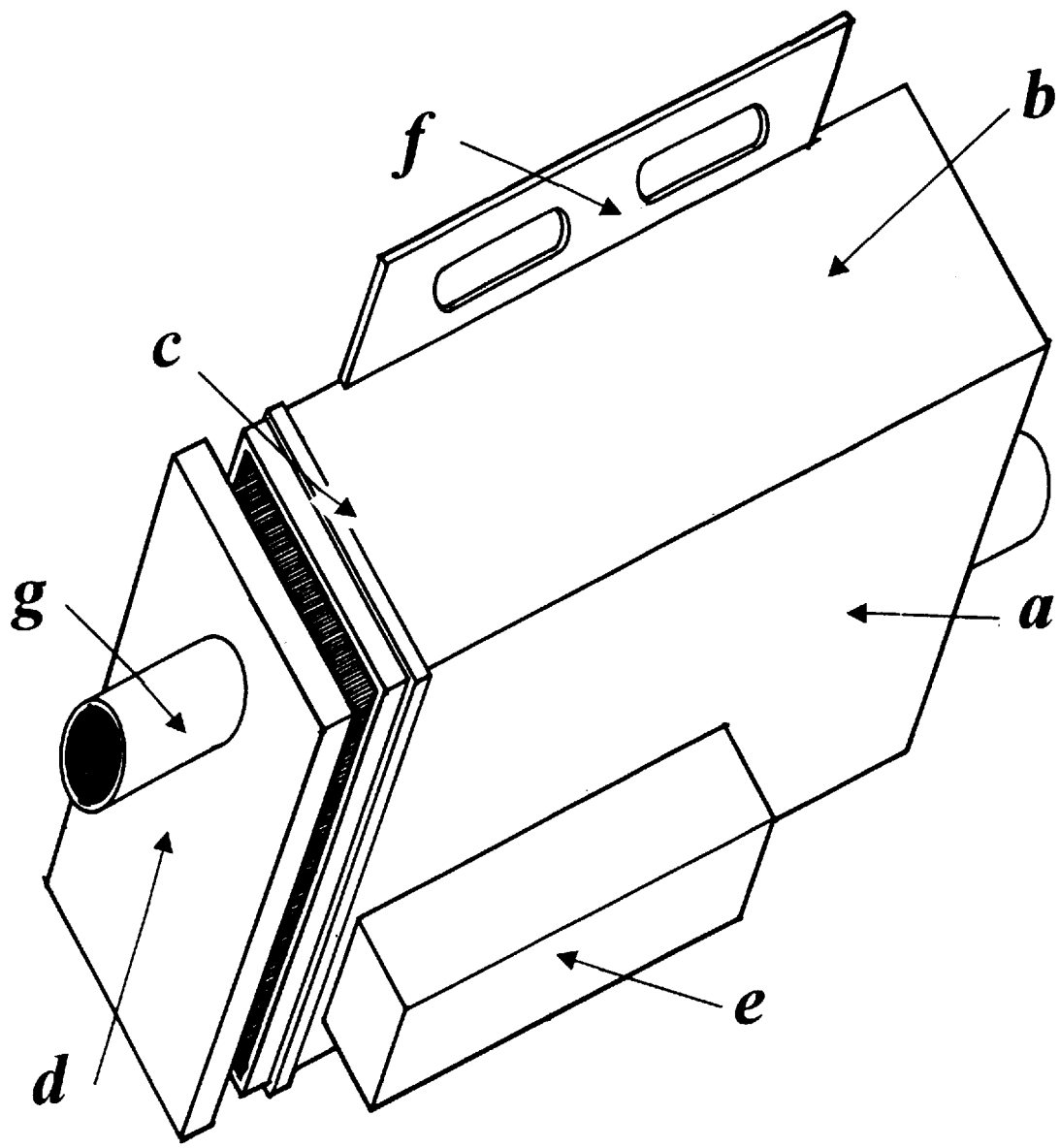
FIG. 1 Top View of the Leak Detector Container with left end cover separated from main body and switch assembly cover.

FIG. 1:

1A—Both sides are $2\frac{3}{4}"L \times 1\frac{5}{8}"W$.

1B—Top of container is $2\frac{3}{4}"L \times 1\frac{1}{16}"W$ and bottom is $2\frac{3}{4}"L \times 1"W$. (provides $\frac{1}{16}"$ front wall taper).

1C—Container end cover sealant block $\frac{1}{16}"W \times \frac{1}{32}"H$ provides a continous protrusion $\frac{1}{8}"$ back from the ends of container walls.

1D—Container end cover is molded to fit over surface of walls and slide over to sealant block.

1E—Switch assembly cover is $1\frac{9}{16}"L \times \frac{1}{2}"W \times \frac{1}{2}"H$ and sealed to container wall after switch is installed and functionally tested.

1F—Mounting panel added to back side is $2"L \times \frac{1}{2}W$ with mounting holes of $\frac{5}{32}"W \times \frac{5}{8}"L$.

1G—Fluid inlet and outlet nipples at each end are $\frac{3}{8}"OD \times \frac{5}{8}"L$.

FIG. 2:

2A—Float assembly is $\frac{29}{32}"W \times 2\frac{29}{32}"L \times 1"H$.

2B—Magnet embedded in front wall of float.

2C—Switch assembly secured to front wall of container.

2D—Brass brads are located near every corner of float.

FIG. 3:

3A—Float assembly end view and also showing taper of front wall of container.

3B—Magnet is embedded into the plastic float and secured by a sealant.

Magnet is $\frac{3}{16}" \times \frac{1}{4}" \times \frac{1}{2}"$.

3C—End view of switch assembly and cover showing the position of the brass strips. Bottom portion of the strips are secured to a plastic plate prior to installion on container wall.

3D—Upper brass strip with magnet contained therein.

3E—Lower brass strip connected to warning indication circuit.

3F—Tapered surface on front wall of container.

Dimensions given in FIGS. 1, 2 and 3 are approximate.

Drawings are double size.

We claim:

1. A leak detector functional assurance apparatus with a warning indication circuit to detect a liquid coolant radiator leak in a vehicle engine hood area, comprising: a liquid leak detector container installed in series with an overflow hose on said radiator leading to an overflow tank, further comprising a plastic foam float formed of proper size to fit within said container and having a magnet inserted therein, said float having round head brass brads in each corner thereof to provide positive rise and fall of the float within the coolant container, and a switch actuator assembly having electrical contacts for said warning circuit formed by a top brass strip holding a magnet and a bottom brass strip both secured to front wall of said container, where the top brass strip is positioned horizontally to enable making electrical contact with the float magnet when the top strip is drawn towards said container wall by said float magnet so that the two magnets will never fail to close the electrical contacts of said switch actuator because the spring tension of the brass strips within said assembly plus the points of contact being in a horizontal position serves to prevent any electrical contact due to any occurrence of mechanical vibrations.

2. The leak detector apparatus of claim one further comprising electrical leads that are soldered to the brass strips at the base of said switch actuator assembly, where the points of electrical contact are coated with a non-corrosive solder to make positive electrical contact therebetween.

3. The leak detector of claim two further comprising where said switch assembly has a switch assembly cover that is secured with a sealant to prevent possible arcing from igniting any explosive fumes in said engine hood area.

4. The leak detector apparatus of claim 3 with said warning indication circuit further comprising a vehicle operator alarm means that can be used to provide a warning when the liquid coolant in a radiator of said vehicle has reached a cautious liquid level.

* * * * *